United States Patent [19]

Mangus et al.

[11] 3,968,834

[45] July 13, 1976

[54] HEAT EXCHANGER MOUNTING FOR A TURBINE ENGINE

[75] Inventors: Ervin E. Mangus, Brimfield; Richard W. Kizer, Morton; D. Craig Young, Peoria, all of Ill.

[73] Assignee: Caterpillar Tractor Co., Peoria, Ill.

[22] Filed: Feb. 7, 1975

[21] Appl. No.: 548,112

[52] U.S. Cl. ................................. 165/82; 165/68; 60/39.51 R; 60/687
[51] Int. Cl.² ............................................ F28F 7/00
[58] Field of Search .......................... 165/68, 82, 83; 60/39.51 R, 687

[56] References Cited
UNITED STATES PATENTS

| | | | |
|---|---|---|---|
| 1,834,001 | 12/1931 | Modine | 165/82 |
| 1,973,678 | 9/1934 | Askin | 165/82 |
| 2,268,360 | 12/1941 | Walker | 165/82 |
| 3,759,323 | 9/1973 | Dawson et al. | 60/39.51 R X |

*Primary Examiner*—Albert W. Davis, Jr.
*Assistant Examiner*—James D. Liles
*Attorney, Agent, or Firm*—Phillips, Moore, Weissenberger, Lempio & Strabala

[57] ABSTRACT

A heat exchanger core made up of a loose stack of heat exchange sheets is surrounded by a support frame which holds the sheets against separation. One end of the support frame is mounted on the engine body and restrained against vertical, fore-and-aft and sidewise movement relative to the engine body. The other end of the support frame is mounted on the engine body by a double pivot link assembly which restrains that end against vertical and sidewise movement but allows fore-and-aft movement. A simple expansion bellows joins the high-pressure air inlet of the heat exchanger to the engine body. A simple expansion bellows may be used to join either or both of the high-pressure air outlet and low-pressure hot exhaust gas inlet of the heat exchanger to the engine body.

9 Claims, 6 Drawing Figures

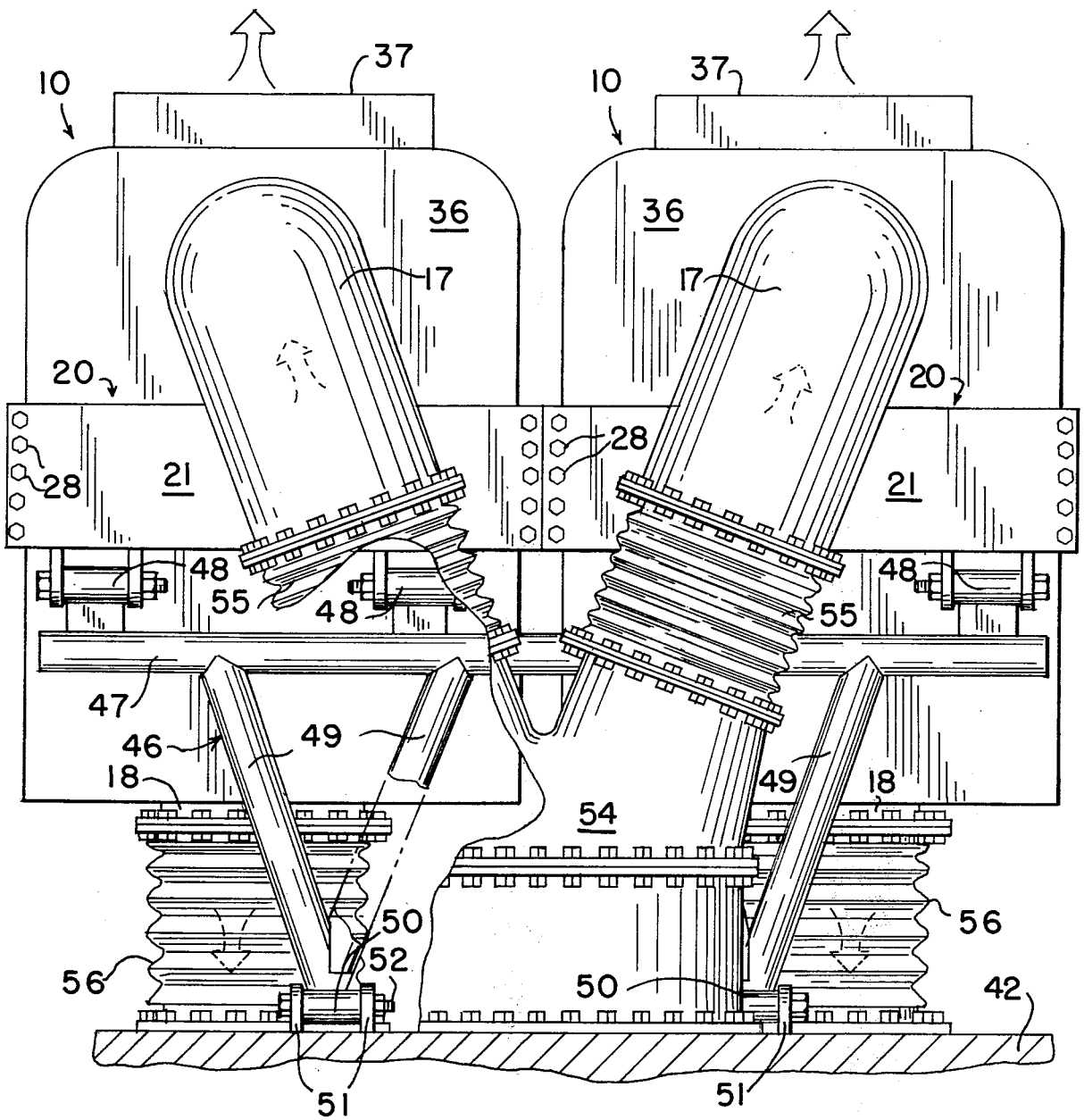
Fig_2_

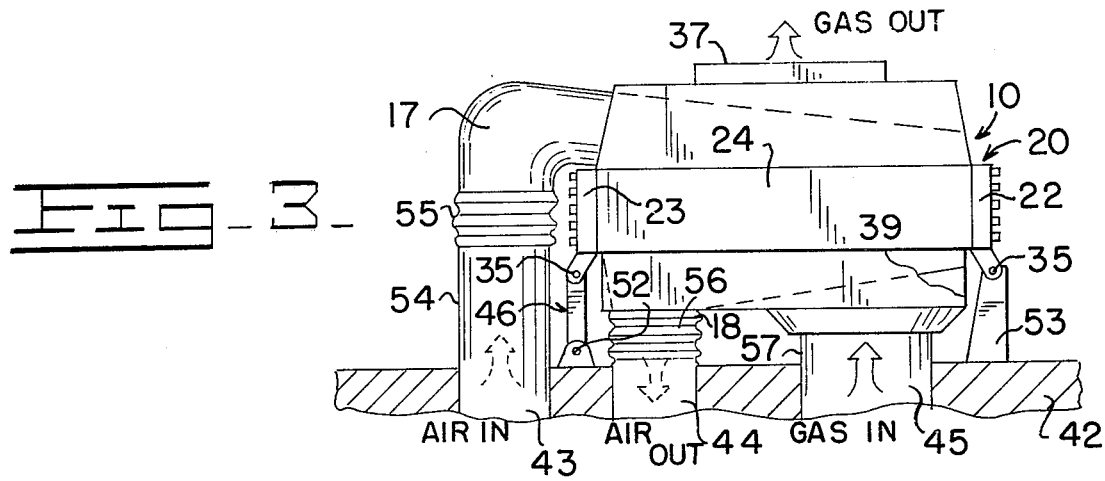
FIG_3_
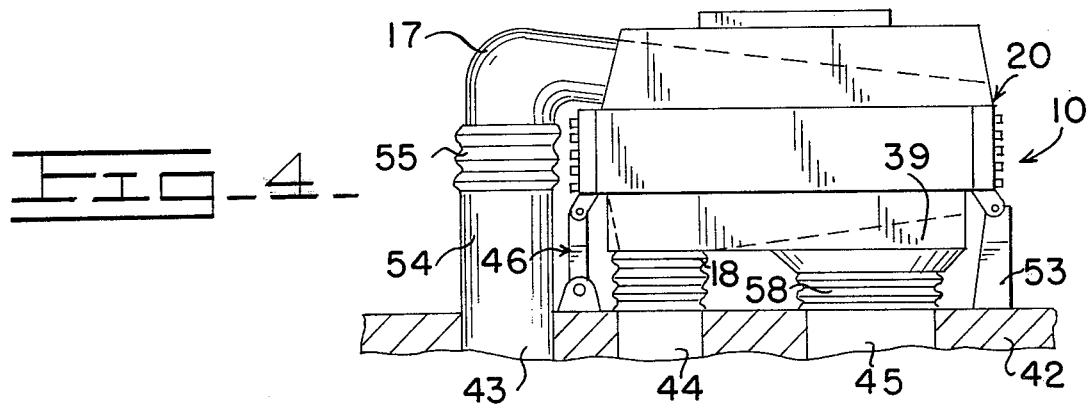
FIG_4_
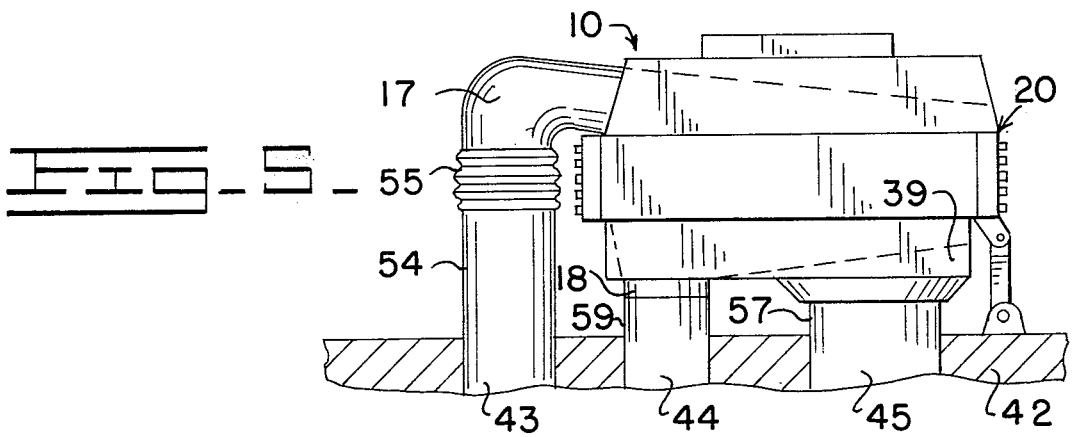
FIG_5_
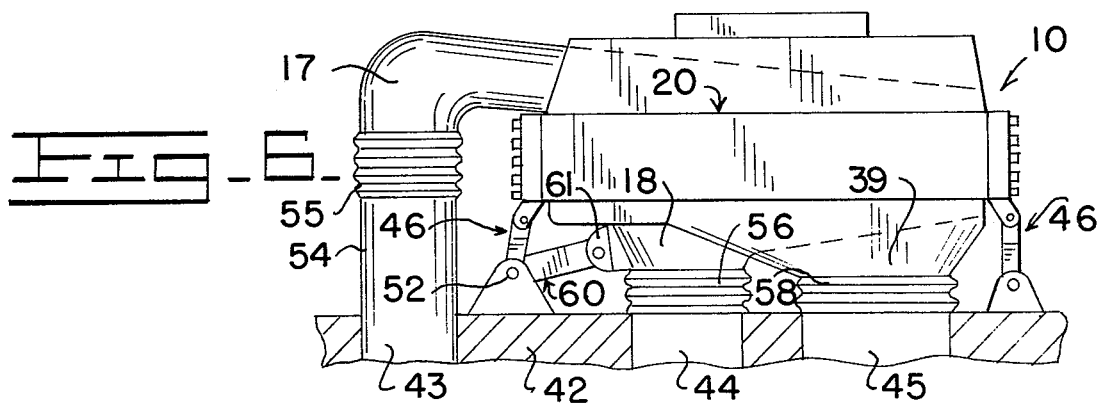
FIG_6_

HEAT EXCHANGER MOUNTING FOR A TURBINE ENGINE

BACKGROUND OF THE INVENTION

This invention relates to a heat exchanger mounting for use on gas turbine engines.

In gas turbine installations it is common to use a heat exchanger so that the hot exhaust gases can heat the incoming combustion air. In general such heat exchangers have cores which provide two separate flow paths therethrough, the flow paths being separated by thin walls. Combustion air under high pressure from a compressor flows through one path while the low-pressure, hot exhaust gas flows through the other path, the heat from the exhaust gas being given up through the separating walls to the combustion air.

When gas turbines are operated intermittently and under varying power conditions, as is usual in vehicle engines, the heat exchanger is subjected to great variations in temperature of the exhaust gases, which causes large transient thermal growths in the core, ducting and support structures and resultant stresses in and between these elements. In addition, normal vehicle operation will impose vertical, fore-and-aft, and sidewise vibration and shock loads on the heat exchange units.

In the past, gas turbine heat exchangers have been mounted by using sheet metal ducting between the heat exchanger and engine body for the low-pressure exhaust gas. The high-pressure combustion air ducting has included spring compensated bellows to absorb relative expansion and limit pressure, thermal and other loads imposed on the heat exchanger. These systems are complicated, difficult to analyze for loads and, therefore, not an ideal solution with high reliability.

SUMMARY OF THE INVENTION

It is an object of this invention to provide a heat exchanger mounting which does not use exhaust gas duct mounting. It is a further object of this invention to provide a mounting for a heat exchanger having a core made up of a loose stack of heat exchange wall sheets, the core being joined to rigid air manifolds to provide a compact assembly having a low profile, of the type disclosed in U.S. Pat. No. 3,759,323, issued to Dawson et al on Sept. 29, 1973.

In general, a support frame surrounds the core to hold the core sheets against separation. One end of the frame is supported above the engine body and restrained from vertical, fore-and-aft, and sideward movement relative to the engine body. The other end of the frame is supported by a double pivot link assembly which restrains that end from both vertical and sideward movement, but allows fore-and-aft endwise movement to accommodate thermal expansion and contraction of the core along its length. A simple expansion bellows is used in the ducting to the high-pressure air inlet, which bellows enables relative thermal expansion and contraction to take place. Due to the mounting arrangement such bellows does not have to support any of the loads imposed on or by the heat exchanger. Simple expansion bellows may also be used for either or both the high-pressure air outlet and the low-pressure hot exhaust inlet of the heat exchanger.

BRIEF DESCRIPTION OF THE DRAWINGS

In the drawings forming a part of this application, and in which like parts are designated by like reference numerals throughout the same.

FIG. 2 is an end elevational view of a typical arrangement of two heat exchanger units, each as shown in FIG. 1, mounted in side-by-side relationship on a turbine engine body;

FIG. 3 is a simplified side elevational view of the mounting of the heat exchanger unit of FIGS. 1 and 2 on a turbine engine body;

FIGS. 4, 5 and 6 are views similar to FIG. 3, showing alternative mounting arrangements.

DESCRIPTION OF THE PREFERRED EMBODIMENT

Figure 1:
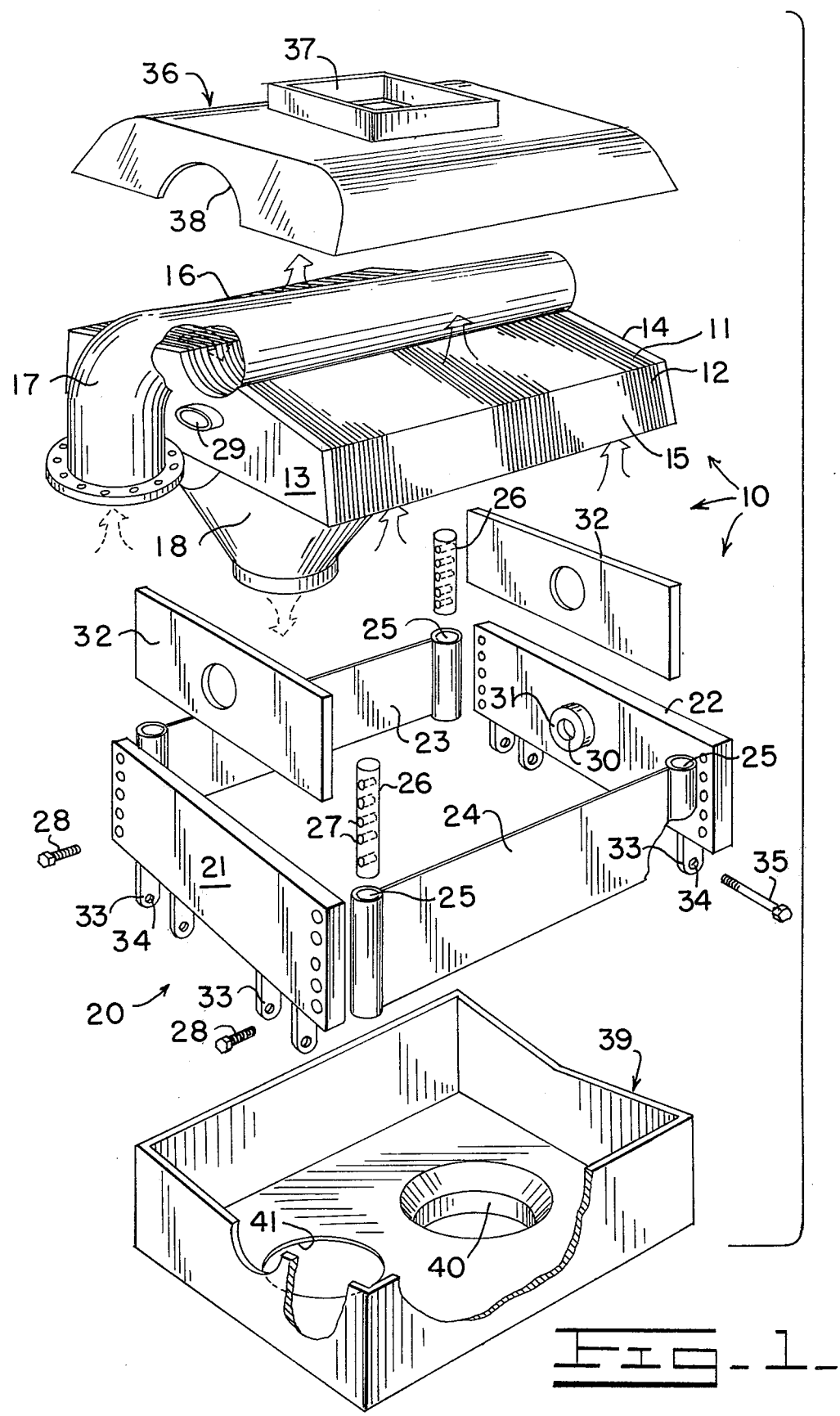
FIG. 1 is an exploded perspective view of a heat exchanger unit constructed in accordance with the present invention.

Referring now to FIG. 1, the heat exchanger unit 10 includes an elongated core 11, made up of loosely stacked sheets 12, preferably as shown in the aforesaid U.S. Pat. No. 3,759,323, the disclosure of which is incorporated herein by reference. Core 11 has opposed end members 13 and 14 and opposed side surfaces 15 and 16. An air-in manifold 17 extends along the length of the core and is integrally connected to the upper surface to supply air to the core and to provide structural rigidity thereto. Similarly, an air-out manifold 18 extends along the length of the lower surface of the core and is integrally connected thereto. Air under pressure flows through the manifolds 17 and 18 and core 11 as indicated by the dotted-line arrows and gas flows through the core as indicated by the solid-line arrows.

The ends and sides of the core 11 are surrounded by support frame 20 which includes rigid end beams 21 and 22 and side tie panels 23 and 24. A loop 25 on each end of the tie panels retains a rod 26 having a plurality of tapped holes 27 to receive bolts 28 so that the tie panels may be tensioned to pull the end beams together and prevent deformation of the core ends or separation of the core plates 12 due to internal air pressure load. The core 11 is located in the support frame and supported against upward or downward movement relative thereto by an outwardly projecting boss 29 on each end member of the core which fits into the bore 30 of the pilot ring 31 secured to each end beam 21 and 22. An asbestos insulator sheet 32 is disposed between the core ends and the end beams 21 and 22 to reduce thermal deflection of the beams. Lugs 33 are attached integrally with the end beams 21 and 22, the lugs having holes 34 therethrough for the reception of pivot bolts 35.

An upper cover 36 fits onto the upper surface of core 11, the cover having a top opening 37 for the escape of exhaust gas from the core and an end opening 38 to fit onto the air-in manifold 17. A lower gas-in manifold 39 encloses the lower surface of the core and has a gas-in opening 40 and an opening 41 through which the air-out manifold 18 extends.

Referring now to FIGS. 2 and 3, the turbine engine body 42 has an air-in passage 43 connected to the outlet of a high-pressure air compressor (not shown), an air-out passage 44 connected to the combustion chamber (not shown) and a gas-in passage 45 connected to the discharge from the turbine (not shown).

The body 42 shown in the drawings may be part of the turbine engine itself or of auxiliary equipment integral therewith.

One end of each heat exchanger unit 10 is mounted on the turbine engine body 42 by a double pivot rigid link assembly 46, as best seen in FIG. 2. Link assembly 46 comprises a horizontal rod 47 having bearings 48 secured thereto which fit between lugs 33 on end beam 21 and receive pivot bolts 35 therethrough. Struts 49 extend downwardly from rod 47 and carry bearings 50 on the lower ends thereof which fit between lugs 51 on the engine body and pivot on pivot bolts 52.

The other end of each heat exchanger unit is mounted to the frame by means of pivot bolts 35 which pass through a rigid bracket 53 fixed to the turbine engine body 42.

The air-in manifolds 17 are connected to the air-in passage 43 by a rigid duct 54 and by expansion bellows 55. The air-out manifolds 18 are connected to the air-out passage 44 by an expansion bellows 56. The gas-in manifold 39 is connected to the gas-in passage 45 by a sheet metal duct 57.

The mounting structure described above provides for free thermal expansion of the heat exchanger unit and core thereof while at the same time providing for support against mechanical loads and shock imposed on the heat exchanger unit. Both the inlet and outlet high-pressure air ducts contain bellows to provide means of absorbing relative thermal expansion growth between the engine and the heat exchanger unit, and to relieve high thermal induced loads from the heat exchanger unit. The boss and ring connection between the core and support frame end beams supports the weight of the core, absorbs shock loads and the axial separating load imposed on the bellows by the high-pressure air therein and transfers such loads to the link connections and brackets to which the end beams are mounted. The pressure load in the core, which acts to separate the sheets, is resisted by the flat end beams at the ends of the core. The rear end of the heat exchanger unit is supported by fixed brackets 53 which support that end of the heat exchanger unit spaced a fixed distance from the body and restrain that end of the unit against endwise movement relative to the engine body from fore-and-aft loads imposed on the heat exchanger unit due to vehicle motion or other causes. The double pivot linkage at the front end supports that end an essentially fixed distance from the body because the linkage is vertically disposed while allowing endwise movement of the front end of the core to accommodate thermal expansion and contraction of the core along its length. The bracket mounting and double pivot linkage also prevent any sidewise movement of the heat exchanger unit relative to the body due to side loads imposed on the heat exchanger unit from vehicle motion or other causes.

FIG. 4 illustrates a modification of the mounting of FIG. 1. Since the fixed and pivoted mountings at the ends of the support frame 20 can bear the full load on the heat exchanger unit, the rigid duct 57 connecting the gas-in manifold to the gas-in passage 45 can be replaced by an expansion bellows 58, to absorb loads resulting from relative thermal expansion between the heat exchanger unit and the engine body.

FIG. 5 illustrates yet another modification of the invention. Again, the air-in manifold 17 is connected to the air-in passage by an expansion bellows 55. Tjhe air-out manifold 18 is connected by a rigid duct 59 bolted to the engine body 42. The gas-in manifold 39 is connected to the gas-in passage 45 by a sheet metal duct 57 (or, alternatively, an expansion bellows could be used therefor, as in FIG. 4).

In this concept the duct 59 serves two purposes. First, it provides the necessary communication between the air-out manifold 18 to the air-out passage 44. Secondly, it supports the front end of the heat exchanger unit 10 spaced from the engine body and restrains that end against endwise or sidewise movement, thus providing the function of the bracket 53 connection of FIGS. 3 or 4. The pressure separating load from the air-in bellows 55 is carried through the front end of the heat exchanger unit to the air-out manifold 18 and the duct 59. Therefore, a portion of the weight, pressure and shock loads are held or transferred to the duct 59, and the remainder transferred to the double pivot link assembly 49 at the rear end of the heat exchanger unit. The link assembly 49 permits lengthwise thermal expansion or contraction of the heat exchange unit and core thereof while restraining against sideward, up or down movement of the heat exchanger unit.

The further modification illustrated in FIG. 6 is recommended for higher horsepower application. The high-pressure air-in and air-out manifolds 17 and 18 are connected to the air-in and air-out passages 43 and 44 by expansion bellows 55 and 56. For full flexibility, the gas-in manifold 39 is connected to gas-in passage 45 by an expansion bellows 58, as in FIG. 4. Otherwise, the gas-in manifold may be so connected by a sheet metal duct 57, as in FIG. 3.

Both ends of the heat exchanger unit are mounted on the engine body by a vertically disposed double pivot link assembly 46. In addition, a generally horizontal double pivot link assembly 60 is connected for pivotal movement to the engine body lugs and to lugs 61 on the air-out manifold 18. The generally vertical link assembly 49 at the front end restrains movement of the heat exchanger unit towards and away from the engine body, and also restrains sidewise movement. Endwise movement of the heat exchanger is restrained by the generally horizontal link assembly 60. Thus, the two link assemblies provide the fixed support function of the bracket mounting 53 of FIG. 3. However, since link assembly 46 itself allows endwise movement of the heat exchanger unit, and link assembly 60 itself allows vertical movement, stresses on the link assemblies and heat exchanger unit resulting from thermal expansion and contraction, shock loads and pressure loads will be much less than if a rigid bracket mounting were used. The link assembly 46 at the rear end of the heat exchanger unit supports against vertical or sidewise loads while allowing fore-and-aft expansion and contraction.

What is claimed is:

1. In a heat exchanger mounting system for a turbine engine:

a. a heat exchanger unit comprising an elongated core having opposed upper and lower surfaces, opposed end members and opposed side surfaces, an air-in manifold integrally connected to the upper surface of said core and an air-out manifold integrally connected to the lower surface of said core, b. said heat exchanger unit further comprising a support frame surrounding the end members and side surfaces of said core, said support frame having rigid end beams and side members extending between the end beams and secured thereto;

c. said heat exchanger unit further comprising means for supporting said core in said frame against upward or downward movement relative thereto;
d. said heat exchanger unit further comprising a gas-in manifold connected thereto,
e. an engine body having air-in, air-out and gas-in passages therein,
f. rigid link means pivoted to said engine body and to one end beam of said support frame for supporting said end beam spaced a substantially fixed distance from said engine body and for restraining said end beam against sidewise movement while allowing endwise movement of said end beam relative to said engine body,
g. means for supporting the other end beam of said support frame spaced a substantially fixed distance from said engine body and for restraining said other end beam against endwise and sidewise movement relative to said engine body,
h. conduit means, including an expansion bellows therein, connecting and communicating said air-in manifold to and with said air-in passage,
i. conduit means connecting and communicating said gas-in manifold to and with said gas-in passage.

2. A combination as set forth in claim 1, wherein said means (c) comprises projecting bosses and boss-receiving sockets on adjacent end beams of said support frame and end members of said core.

3. A combination as set forth in claim 1 and further including thermal insulation means disposed between the end beams of said support frame and the end members of said core.

4. A combination as set forth in claim 1 wherein said means (g) comprises a rigid conduit connecting and communicating said air-out conduit to and with said air-out passage.

5. A combination as set forth in claim 1, wherein said means (i) includes an expansion bellows therein.

6. A combination as set forth in claim 1, and further including:
j. conduit means connecting and communicating said air-out conduit to and with said air-out passage.

7. A combination as set forth in claim 6, wherein said means (j) includes an expansion bellows therein.

8. A combination as set forth in claim 6, wherein each of said means (i) and (j) includes an expansion bellows therein.

9. A combination as set forth in claim 7 wherein said means (g) comprises a first rigid link means pivoted to said engine body and pivoted relative to said other frame end beam for restraining movement of said other frame end beam towards and away from said engine body while allowing endwise movement of said other frame end beam relative to said engine body and a second rigid link means pivoted to said engine body and pivoted to said heat exchanger unit for restraining endwise movement of said other frame end beam relative to said engine body while allowing upward and downward movement of said other frame end beam towards and away from said engine body.

* * * * *